United States Patent [19]
Beikirch et al.

[11] Patent Number: 5,315,414
[45] Date of Patent: May 24, 1994

[54] SYSTEM FOR CONTROLLING MULTIPLE FILTERS IN A COLOR RASTER INPUT SCANER

[75] Inventors: Thomas R. Beikirch, Webster; Richard A. Beck, Fairport; Jack K. Fullerton, Webster; Joseph P. Taillie, Pittsford, all of N.Y.

[73] Assignee: Xerox Corporation, Stamford, Conn.

[21] Appl. No.: 947,585

[22] Filed: Sep. 21, 1992

[51] Int. Cl.[5] .......................... H04N 1/46; H04N 1/04
[52] U.S. Cl. .................................... 358/512; 358/505; 358/474
[58] Field of Search ............... 358/512, 515, 504, 501, 358/505, 401, 406, 474

[56] References Cited

U.S. PATENT DOCUMENTS

| | | | |
|---|---|---|---|
| 4,748,514 | 5/1988 | Bell | 358/288 |
| 4,864,415 | 9/1989 | Beikirch et al. | 358/474 |
| 4,931,862 | 6/1990 | Nakao et al. | 358/512 |
| 5,010,415 | 4/1991 | Suzuki | 358/512 |

Primary Examiner—Edward L. Coles, Sr.
Assistant Examiner—Thomas D. Lee
Attorney, Agent, or Firm—Robert Hutter

[57] ABSTRACT

In a color scanner wherein a plurality of filters are selectably disposed in a light path to a sensor array, a target area of a preselected test color is provided adjacent the platen for the image to be scanned. The target area is used to determine which of the plurality of filters is disposed along the light path at a given time.

7 Claims, 4 Drawing Sheets

SYSTEM FOR CONTROLLING MULTIPLE FILTERS IN A COLOR RASTER INPUT SCANER

Cross-reference is made to the following patent application, incorporated herein by reference: U.S. patent application Ser. No. 07/948,043, SYSTEM FOR POSITIONING MULTIPLE FILTERS IN A COLOR RASTER INPUT SCANNER, assigned to the assignee of the present invention and filed simultaneously herewith.

The present invention relates to a raster input scanner (RIS) for color documents, and more specifically to a system for controlling a set of color filters used in scanning color documents.

Raster input scanners typically employ one or more arrays such as charge-coupled devices (CCD's) for scanning. The array converts each scanned image line into a series of charges which, following suitable processing, are output as image signals or pixels to an end user. Scanners of this type often use a transparent platen on which the image bearing document is placed face down. The scanning array is often carried on a carriage which traverses back and forth under the platen to provide the necessary relative motion between image and array. Scanning optics focuses the image onto the array, and one or more lamps are provided to illuminate the image. Scanners of this type are disclosed, for example, in U.S. Pat. No. 4,748,514 or U.S. Pat. No. 4,864,415, both assigned to the assignee of the present invention.

In the typical scanning process, the image area viewed by each of the array photosensors is converted into a charge potential representative of the image gray level. Scanning takes place during an integration period of preset duration. Following integration, the image charges are transferred to a pair of analog shift registers, the operating sequence being such that during the integration period, the image charges from the previously scanned line are clocked from the shift registers, leaving the shift registers free to receive the image charges from the next integration period. The duration of the integration period, which must be sufficiently long to fully integrate the image line being scanned, yet not so long as to allow the array photosensors to become saturated, is measured by periodic fixed rate clock signals.

An important variation to raster input scanners is the adaptation of such scanners for scanning multi-color images, such as color photographs. One common technique for scanning color images is to scan the original image on the platen several times, each time filtering the light reflected from the image by a filter of one color, such as red, green, or blue. The combination of three separate images filtered into primary colors is then combined by image-processing devices to reproduce the color image. In order to accomplish this sequential multiple scanning of a color image, a common technique is to provide a set of primary color filters which may be mechanically moved into place in front of a sensor array, depending on the desired color to be scanned in. Once one primary color is scanned, the filters are mechanically repositioned so that the next color in the sequence may be scanned into the sensor array. A typical arrangement of such filters may be a set of disc-shaped filters arranged on a larger rotating disc, or the filters may be in the form of elongated rectangles arranged around an axle in a "paddle-wheel" construction. By rotating the paddle-wheel about its axle, a selected one of the multiple filters may be moved into place to be interposed between the source of illumination for the image, and the sensor array. Further, it is common to employ an additional clear filter if it is desired to operate the scanner in monochrome mode. Generally it does not matter whether the light from the illumination means is filtered before or after it is reflected from the image.

One practical problem that has been discovered when using a color scanner with plurality of mechanically-movable filters is that the position of the disc or paddle-wheel may be "forgotten" from job to job by the control system operating the scanner. In networked systems, wherein several image processing systems may be employed on a single network to access a single scanner, it is convenient to arrange the network so that the scanner may be what is known as "brain-dead." That is, it is preferred that the scanner have little or no control software of its own, so that an external computer on the network, having its own individual operating system and protocols, may use the scanner without having to translate or take into account any software instructions originating in the scanner itself. A scanner is ideally the complete "slave" of an image-processing system. On a networked system, various jobs from various users on the network may cause the disc or paddle-wheel to be left in a given position at the end of a particular job, while initiation of the scanner for scanning another job may require the disc or paddle-wheel to start out in another position. Further, if a job should be canceled or the power otherwise disconnected in the middle of a job, the disc or paddle-wheel will be left in an unknown position, and a subsequent job will assume that the disc or paddle-wheel is in one position while it may in fact be in another position, thus ruining the scanning job.

Therefore, there is a need in the art for a system which will automatically orient an arrangement of filters, such as a disc or paddle-wheel, into a known position at the beginning of each job, so that scanning errors resulting from misorientation of the filters will be avoided. It is preferable that the system for orienting the filters require a minimum of mechanical modification to the basic scanner. It is preferable that as much of such a system as possible be embodied as a few additional lines of software in a control system operating the scanner.

In accordance with the present invention, there is provided, in an apparatus for scanning a color document, an image scanner that converts a light image of the color document into a series of scan lines, wherein the improvement comprises a target of a preselected color; a plurality of different color optical filters; and means for indexing a selected one of said optical filters from a not-filtering position to a filtering position, said selected one of said optical filters filtering the light image of the color document and a light image of the target, and the image scanner responding to the optically filtered light image of the target to confirm that said selected one of the optical filters is in the filtering position.

Figure 1:
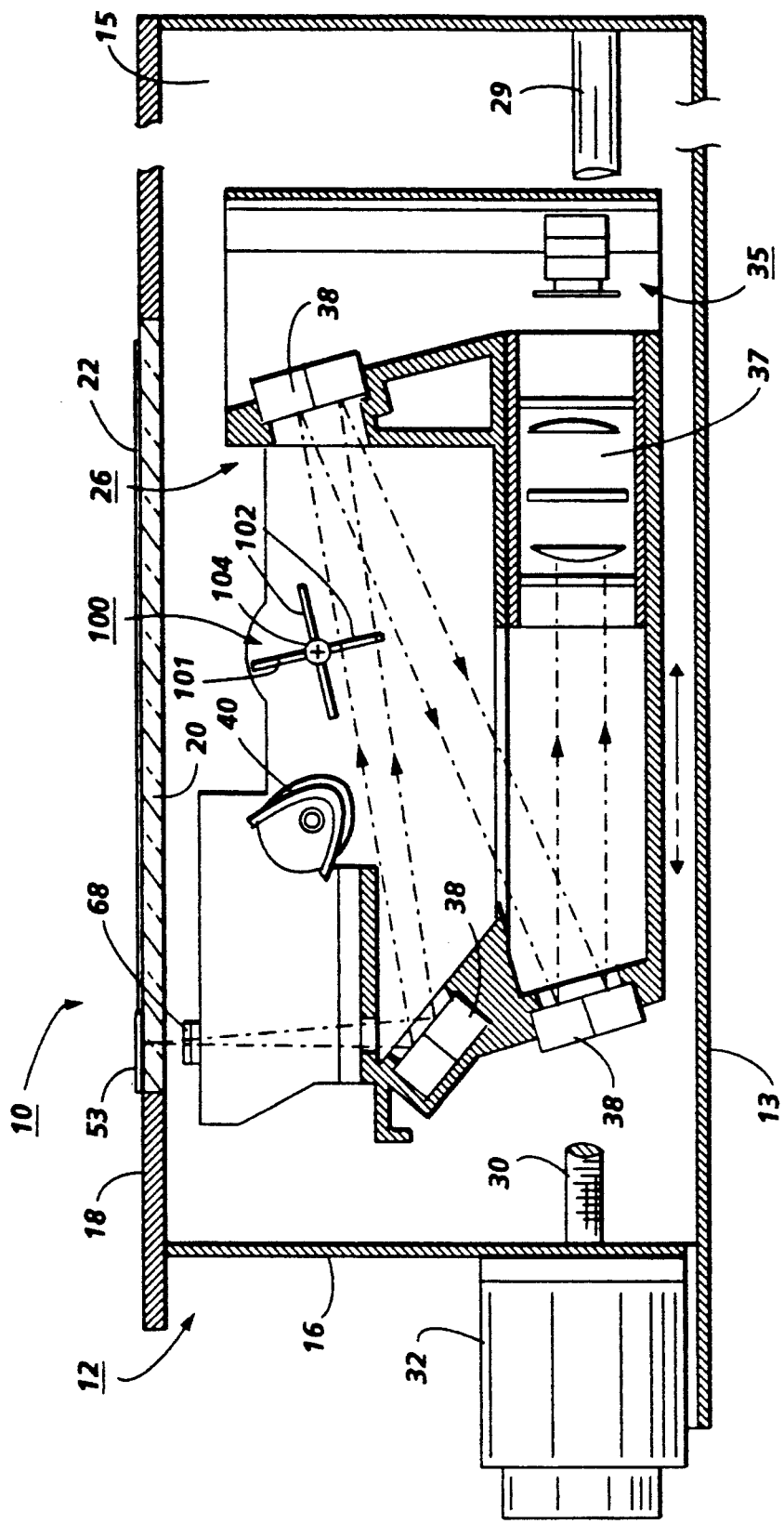
FIG. 1 is a schematic view of a raster input scanner of the type adapted to incorporate the slow scan registration self alignment system of the present invention.
Figure 2:
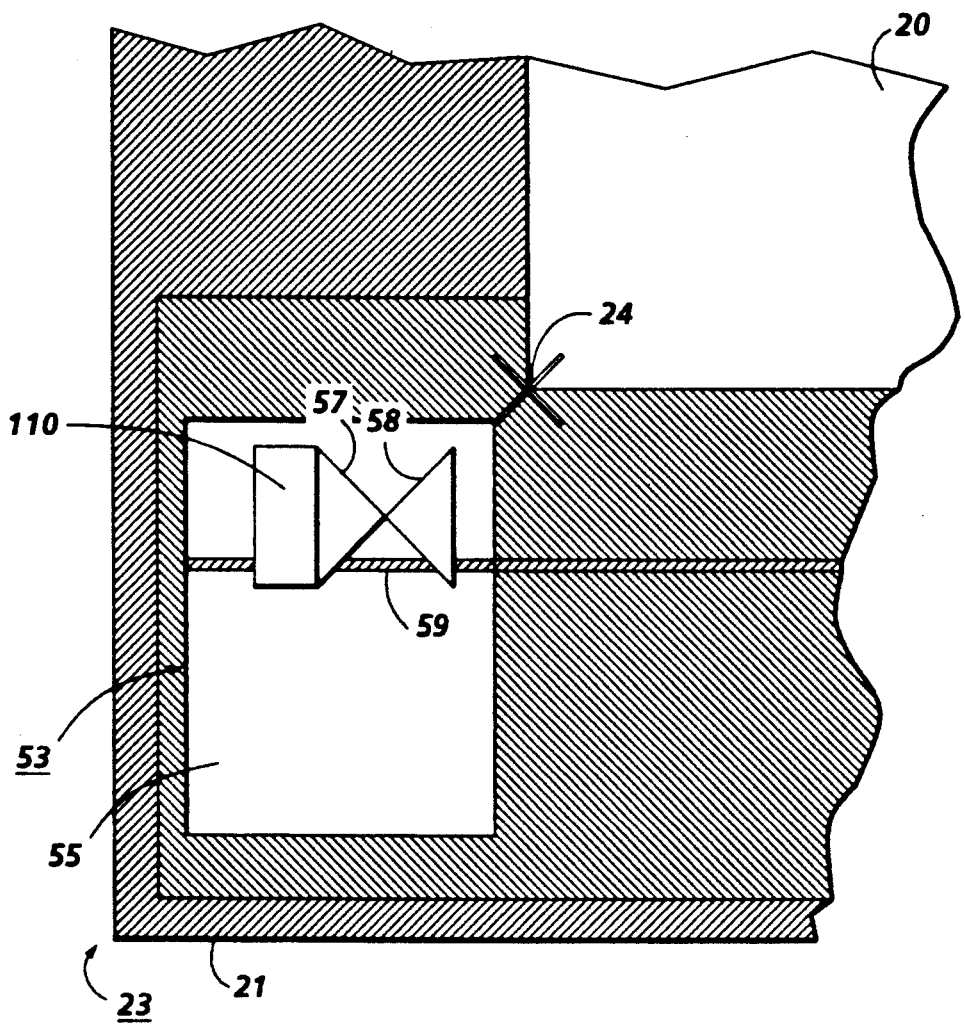
FIG. 2 is a top plan view of a section of the platen of the scanner shown in FIG. 1 depicting the registration target according to the present invention.
Figure 3:
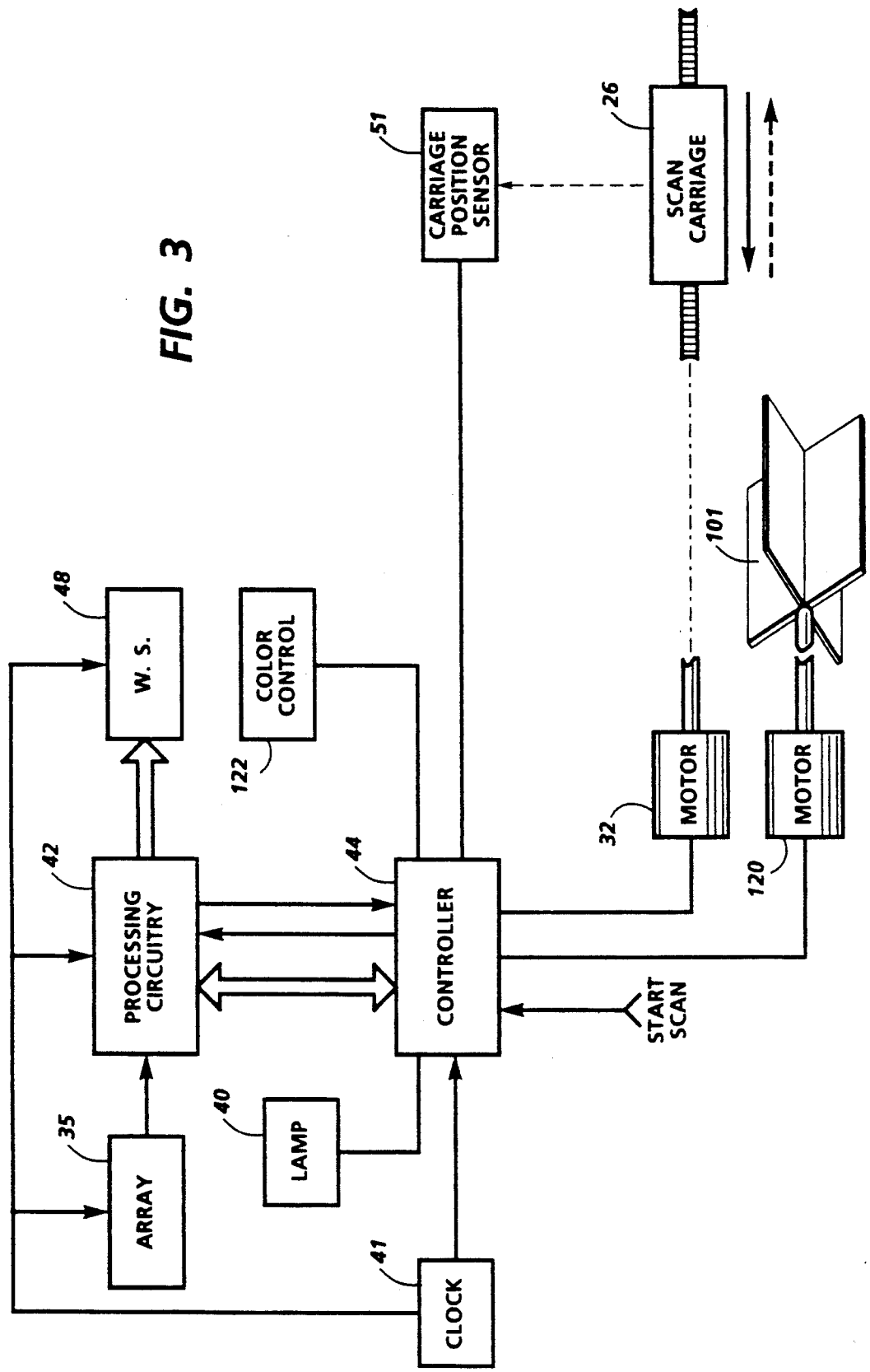
FIG. 3 is a schematic block diagram showing the principal operating elements of the scanner shown in FIG. 1.

Referring to FIGS. 1–3, there is shown an exemplary color raster input scanner, designated generally by the numeral 10, of the type adapted to incorporate the system of the present invention. Scanner 10 includes a housing 12 with base 13, sides 15, and ends 16. The top 18 of housing 12 incorporates a generally rectangular transparent platen 20. Platen 20 is formed from a relatively larger piece of transparent material, typically glass, having an opaque border 31 therearound, border 21 delineating a generally rectangular viewing window sized to accommodate the largest document original 22 to be scanned. One corner 23 of border 21, referred to as the registration corner, provides a document registration point 24 for locating the document to be scanned on platen 20. As will be understood, a document 22 to be scanned is located either manually or by a suitable automatic document handler or feeder (not shown) on platen 20 for scanning. In the embodiment shown, a scan carriage 26 is movably supported within housing 12 on base 13 for reciprocating movement in the slow scan direction underneath platen 20 on one or more longitudinally extending rails 29. Also in this embodiment, carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a scan or pre-scan direction as shown by the dotted line and solid line arrows in drawing FIG. 1 respectively.

A scanning array 35, such as a charge-coupled device (CCD), is suitably mounted on scan carriage 26 in predetermined operative relation with platen 20 so as to scan the document resting thereon. Array 35 is disposed so that the scan axis (designated the fast scan direction) is substantially perpendicular to the direction of movement of carriage 26 on rails 29. Suitable optical means, exemplified here by lens 37 and mirrors 38, are provided to focus a line-like area extending across the width of platen 20 and perpendicular to the direction of movement of carriage 26 on array 35. For purposes of controlling the scanning process, the position of scan carriage 26 may be detected by a carriage position sensor 51. A lamp 40 is provided for illuminating the line-like area which is focused on array 35. A suitable clock 41 (shown in FIG. 3) provides clock signals for operating the system including driving array 35. The image signals generated by scanning array 35 are converted to digital form by an analog-to-digital (A/D) converter (not shown) and output to suitable image signal processing circuitry 42. Following processing, the image signals representing the document image are output to the user or workstation 48 such as a publishing workstation, personal computer, printer, etc. The coordination of the various mechanical and image-processing elements of the apparatus is preferably centrally controlled by a controller 44, which may, for example, be in the form of a microprocessor.

Returning to FIG. 1, there can also be seen, marked generally as 100, a filter set by which a selected one of a plurality of translucent filters 102 may be interposed along the light path between the platen 20 and the sensor array 35. As shown in FIG. 1, the filter system 100 is in the form of a paddle-wheel 101 having a series of filters 102 arranged about an axle 104. In this embodiment, the filters are interposed between two of the mirrors 38, along the light path between the image and the sensor array 35. It may also be possible, in an alternate design of the scanning system, to place the selected one of the filters 102 between the lamp 40 and the image on platen 20. What is important is that the light be filtered according to the selected filter somewhere along the light path. In the embodiment shown, four filters 102 are provided, one for each of the colors red, green, and blue, plus an additional clear filter for operation in monochrome mode. In this embodiment, it is intended that each filter 102 be generally rectangular in shape, approximately eight inches long along the axle 104, and approximately one-half inch wide. By rotating the paddle-wheel 101 around its axle 103, it is possible to interpose only one of the filters 102 along the light path. The rotation of the paddle-wheel 101 is typically effected by either a separate stepper motor (not shown), or by some sort of mechanical arrangement by which the incidental motion of scan carriage 66 or any part associated therewith, is transferred mechanically for rotation of the paddle-wheel 101. One possible embodiment of such a motion transfer mechanism is disclosed in a co-pending patent application being filed simultaneously herewith, cited at the beginning of this application and incorporated herein by reference.

Also visible in FIG. 1, adjacent platen 20, is a target indicated as 53. Target 53 is attached to the underside of border 21 of platen 20 in registration corner 23, as seen in FIG. 2. Target 53 is sized sufficiently large to extend almost to the outer edge of border 21. For purposes of the present invention, target 53 includes a test patch 110, which is in a position relative to the platen 20 which will not interfere with an image placed on platen 20, but is also in a position to be scanned by the array 35 on scan carriage 26 during one part of the slow-scan of scan carriage 26. Also visible in FIG. 2 are two dark triangles 57 and 58, plus a variable density image area 59, which are in a preferred embodiment used to enable scan registration of an image, in the manner disclosed in detail in U.S. Pat. No. 4,864,415; this registration system is not directly germane to the present invention, but is in the preferred embodiment used in conjunction with the system of the present invention. Test patch 110 is of a predetermined color which will be transmitted more readily through one type of primary-color filter than any other filter on paddle-wheel 101. Thus, when light reflected off the test patch 110 is filtered through a sequence of filters such as are on paddle-wheel 101 and focused on certain sensors in the scanning array 35, a noticeable response will be detected by the CCD sensors of array 35 only when the light reflected from the test patch is not filtered out by a particular filter. For example, if the test patch 110 is red, the light reflected therefrom will cause very little response from a sensor if the reflected light is filtered through a green filter, which will tend to not allow the transmission of non-green light. Because the red light from the test patch 110 will be filtered out by the green filter, a very small response will by output from the sensor. If, however, a filter which allows substantial transmission of the reflected light from the test patch 110 therethrough, a relatively large intensity of light will reach the sensor, resulting in a substantial response output from the sensor.

Thus, by adapting the scanner to detect a signal from the area of the test patch 110 in target 53, the scanner may be adapted to determine the orientation of paddle-wheel 101 at any given time without the addition of any further hardware but the test patch 110. Besides the addition of the test patch 110 in target 53, certain lines of software may be added to any control program external to the scanner by which the scanner is controlled. This extra software will cause the scanner, when the scanning carriage 26 is in a position to detect the area around the target 53, to be sensitive to reflected light from test patch 110. In one case, if a substantial signal from the test patch 110 is detected by a certain sensor, the control system will "know" that the paddle-wheel 101 is at the moment oriented in a certain way, and will thus control the paddle-wheel 101 in accordance with this original position. For example, if it assumed that a red test patch 110 is used, as it is in the preferred embodiment of the present invention, the red filter of paddle-wheel 101 will be best adapted to transmit the light reflected from the test patch 110 so it may be focused on certain of the sensors on the array 35. Thus, in the special "test routine" undertaken by the control system controlling the scanner for a particular job (and which is preferably part of the external image-processing program for the particular job), the system will "know" the orientation of the filter at the beginning of the job, and thus may reposition the filters accordingly in the course of the job for a proper color scan. It is to be assumed that each particular system for running scanning jobs in color will have a preselected order of scanning in the colors of the image which must be followed to be consistent with the rest of the system. By learning the orientation of the filters in the scanner at the beginning of the job, any external computer system may be adapted to use the scanner.

Using the test-patch system of the present invention, a scanner may be adapted in various ways to make use of the ability enabled by the test patch. For example, if a system is sensitive to the particularly high response of a given sensor when (to use the above example) the red filter on the paddle-wheel allows the transmission of reflected light from a red test patch 110 to be transmitted therethrough, a routine may be created within the control system to rotate the paddle-wheel 101 in a predetermined direction until the red filter on the paddle-wheel 101 is found. Once the red filter is found and is known to be in the operative position disposed along the light path, the job proper may begin, because the control system will then know the order of filters being interposed in the light path in each scan. This "finding" of a particular filter among the plurality of filters on a disc or in the paddle-wheel may be made part of an initialization program run at the beginning of every job entered into the scanner.

Alternately, a more sophisticated system may be created using a plurality of test patches 110 at different sites adjacent the platen 20 to direct reflected light to a preselected subset of sensors in the array 35. Such an arrangement of test patches is shown as test patches 110a and 110b in FIG. 4. For example, a red test patch 110a may be at one corner of the platen as shown in FIG. 2, while a blue test patch 110b is provided adjacent to it. Thus, the different test patches may direct light to different physically-separated subsets of sensors in the array 35. If the sensors corresponding to the blue patch are activated, the system will know that the blue filter is in place, while if there is a response from the red patch, the red filter will be in place. Further, if a high response is output from both subsets of sensors corresponding to both patches, the system will be able to tell that the transparent filter is in place, and if neither subset of sensors is outputting a response, it will be known that the green filter is interposed along the light path.

In general, it is not necessary that the color of a given test patch be exactly equivalent in color to that of the corresponding filter; on the whole, an inexpensive orange sticker can be used as a test patch and will cause a greater quantity of light to pass through the red filter than any other filter. Relatively little precision is required in order to determine the color of the filter, the test patches are extremely inexpensive.

Figure 4:
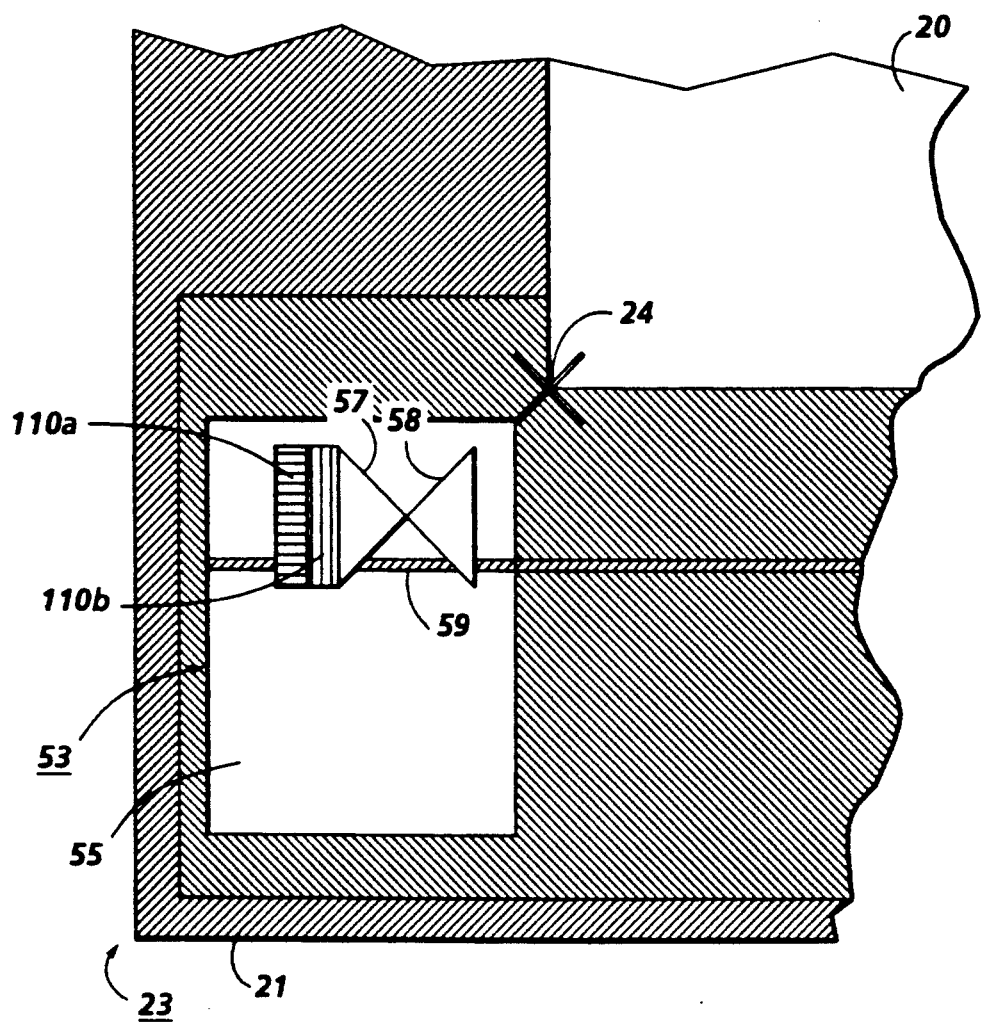
FIG. 4 is a top plan view of a section of the platen of the scanner shown in FIG. 1 depicting the registration target according to an alternate embodiment of the present invention.

Returning to FIG. 3, there is shown, in addition to the general elements of the control system described above, color control means 122 and a motor (preferably a stepper motor) 120 to control the position of paddle-wheel 101 and thus control which of the filters 102 on paddle-wheel 101 is interposed in the light path. The color control 122, which is preferably embodied in software, interacts with the position of the paddle-wheel 101 while allowing image processing system to accept scanned data from the sensors in array 35 with the "knowledge" that the image being entered on the array 35 at a given time is being filtered through a certain color. This information is, of course, necessary for subsequent image processing elsewhere in the system. Preferably, the routine in which the filters in the scanner are oriented for purposes of the rest of the scanning program is initialized at the beginning of the program. In the embodiment of FIG. 4, a color-check routine may be incorporated as part of each color scan within a job, so the system will "know" at the beginning of each scan which color is being scanned, and therefore the actual order in which colors are scanned will not be important.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. In an apparatus for scanning a color document, an image scanner converts a light image of the color document into a series of scan lines, wherein the improvement comprises:

a target of a preselected color;

a plurality of different color optical filters; and means for indexing a selected one of said optical filters from a not-filtering position to a filtering position, said selected one of said optical filters filtering the light image of the color document and a light image of the target, and the image scanner responding to the optically filtered light image of the target to confirm that said selected one of the optical filters is in the filtering position.

2. The improvement as in claim 1, wherein light reflected from the target is focusable on an array of photosensors, each photosensor being adapted to output a response related to light focused thereon, and wherein light reflected from the target and filtered through one of the plurality of filters causes a response from a photosensor substantially different from a response from the photosensor caused by light reflected from the target and filtered through another of the plurality of filters.

3. The improvement as in claim 2, further comprising control means responsive to the response of the photosensor, adapted to determine which of the plurality of filters is in the filtering position.

4. The improvement as in claim 2, wherein the plurality of filters are disposed on a positionable member, and further including means for orienting the positionable member to dispose a selected one of the plurality of filters in the filtering position.

5. The improvement as in claim 2, whereby the target is disposed relative to the array whereby light reflected from the target is capable of being focused on a preselected subset of photosensors in the array.

6. The improvement as in claim 5, further comprising a second target, of a preselected color different from that of the first-mentioned target, and disposed relative to the array whereby light reflected from the second target area is capable of being focused on a second preselected subset of photosensors in the array.

7. The improvement as in claim 6, wherein the control means includes means for determining which of the plurality of filters is in the filtering position, based on the responses of photosensors of the first-mentioned and second preselected subsets of sensors of the array.

* * * * *